United States Patent [19]
Brink et al.

[11] 3,718,446
[45] Feb. 27, 1973

[54] POLLUTANT-FREE PROCESS FOR PRODUCING A CLEAN BURNING FUEL GAS FROM ORGANIC-CONTAINING WASTE MATERIALS

[75] Inventors: David L. Brink; Jerome F. Thomas, both of Berkeley, Calif.

[73] Assignee: The Regents of the University of California, Berkeley, Calif.

[22] Filed: Feb. 18, 1970

[21] Appl. No.: 12,315

[52] U.S. Cl. ............48/209, 23/262, 23/277 R, 48/111, 48/197 R, 48/203, 423/207
[51] Int. Cl. ............C10j 3/10, C10j 3/14, C10j 3/20
[58] Field of Search............48/111, 197 R, 203, 209; 203/48, 262

[56] References Cited

UNITED STATES PATENTS

| | | | |
|---|---|---|---|
| 3,574,556 | 4/1971 | Buxton | 23/262 |
| 1,536,696 | 5/1925 | Wallace | 48/209 UX |
| 1,799,885 | 4/1931 | Chavonne | 48/203 |
| 1,818,901 | 3/1931 | Mallery | 48/197 R X |
| 2,535,730 | 12/1950 | Gadret | 23/48 |
| 2,946,670 | 7/1960 | Whaley | 48/203 X |
| 2,992,906 | 7/1961 | Guptill | 48/203 X |
| 3,110,578 | 11/1963 | Severson et al. | 48/203 |
| 3,323,858 | 6/1967 | Guerrieri | 23/48 |
| 3,333,917 | 8/1967 | Bergholm | 23/262 R X |
| 3,471,275 | 10/1969 | Borggreen | 48/197 R X |

FOREIGN PATENTS OR APPLICATIONS

| | | | |
|---|---|---|---|
| 671,026 | 9/1963 | Canada | 48/197 R |
| 578,711 | 7/1946 | Great Britain | 48/203 |

Primary Examiner—Barry S. Richman
Attorney—Stanley Bialos

[57] ABSTRACT

A process involving the high temperature distillation and pyrolysis of an organic material such as kraft black liquor, formed during conventional chemical wood pulping, to break down the material to non-combustible solids and to a stable gaseous clean burning fuel. The process involves introduction of malodorous-containing gaseous emissions from the pulping operation as a source of oxygen for attaining the temperature necessary for the pyrolysis but insufficient to effect stoichiometric (complete) combustion of the organic material. These kraft mill malodorous emission gases are occasionally burned with inherent incomplete combustion, leaving significant amounts of obnoxious gases to pollute the atmosphere.

7 Claims, 1 Drawing Figure

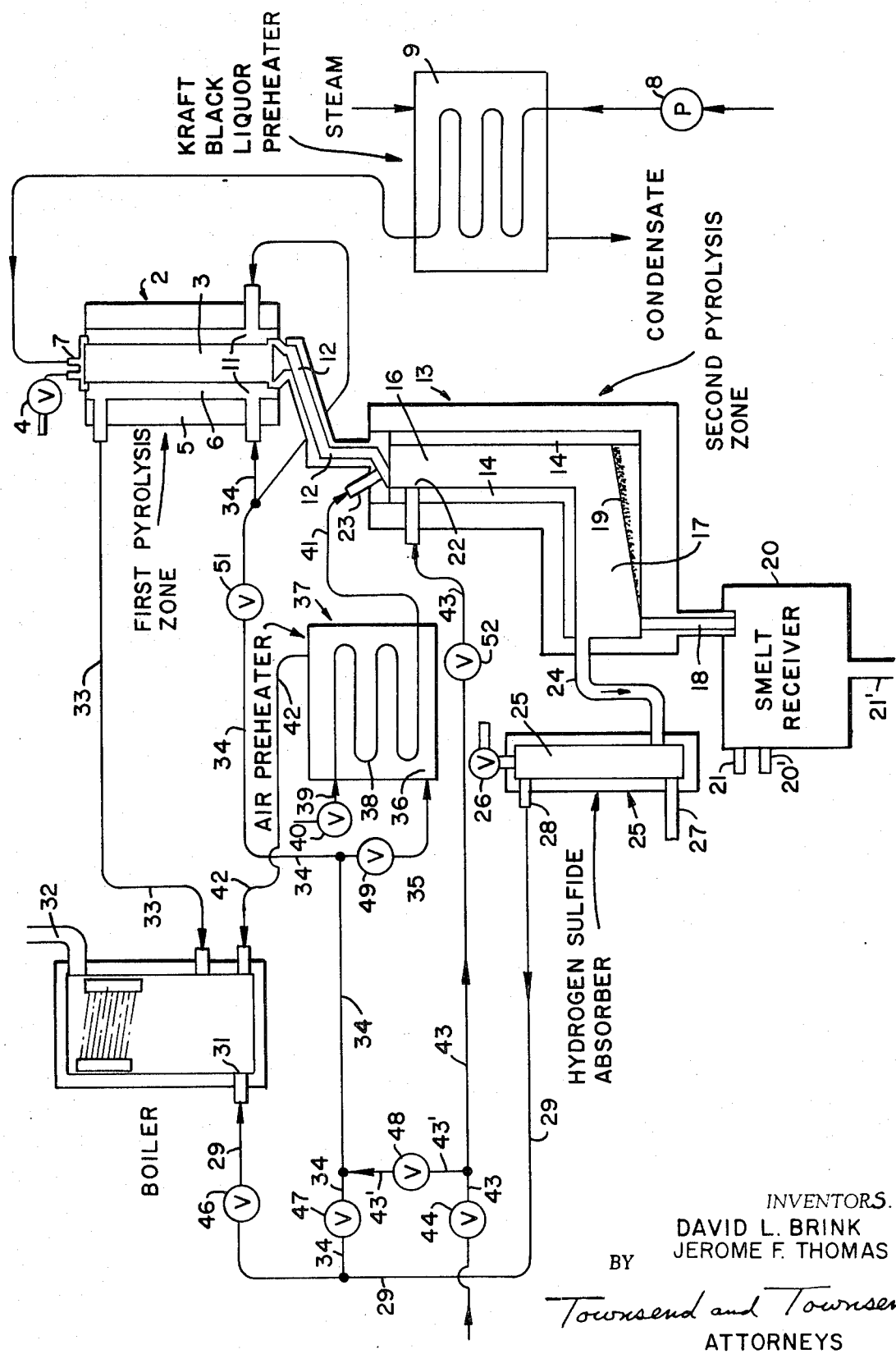

POLLUTANT-FREE PROCESS FOR PRODUCING A CLEAN BURNING FUEL GAS FROM ORGANIC-CONTAINING WASTE MATERIALS

The invention described herein was made in the performance of work under research grants from the United States Public Health Service.

BACKGROUND OF THE INVENTION

Gaseous emissions from chemical wood pulping operations, such as Kraft mills, have received increasing attention in recent years. Such processes are a source of malodorous emissions such as hydrogen sulfide, methyl mercaptan, dimethyl sulfide, dimethyl disulfide, and terpenes. These malodorous sulfur-containing emission gases are by-products resulting from the dissolution of certain of the wood pulps organic constituents in the strong alkaline solution of sodium hydroxide and sodium sulfide. The problem has been intensively investigated by the pulping industry, and governmental, educational, and private research institutions. Significant progress has now been made so that modern, well-operated chemical mills such as Kraft mills have substantially reduced odor emissions from their operations. Yet the human response to odor is qualitative, and in spite of real progress, the odor problem persists even when the malodorous substances are substantially eliminated. Copending U.S. Patent Application Ser. No. 795,288, filed Jan. 30, 1969 now U.S. Pat. No. 3,639,111, dated Feb. 1, 1972, exemplifies the methods employed to reduce malodorous emissions.

That application relates to the pyrolysis (chemical transformation of a material into one or more new substances solely through the application of heat) of various organic materials such as garbage, fuels, wastes and kraft black liquor.

There it was emphasized that in the combustion of organic material, there is a simultaneous occurrence of endothermic and exothermic reactions during which very reactive intermediate products such as carbon free radical fragments (i.e., free radicals containing carbon), atomic hydrogen, atomic oxygen, hydroxyl free radicals and perhydroxy free radicals, are formed. The reactive intermediate carbon free radicals in typical combustion processes recombine and form gaseous air pollutants such as saturated and unsaturated aliphatics and polynuclear aromatics (arenes). The employment of pyrolysis, including limited oxidation, and temperature control was found to minimize this problem. Such destructive distilling and pyrolyzing of organic materials above a critical temperature zone and for a sufficient length of time formed gases that can be reduced or cracked to stable end products useful as a stable clean burning gaseous fuel. By maintaining pyrolysis above such critical temperature, recombination reactions of the unstable intermediate products formed during the combustion are prevented, thus eliminating pollutants. The gaseous end product can be burned as any other typical fuel but will burn clean without polluting the atmosphere.

The aforementioned Kraft mill pulping process creates, in addition to the aforementioned black liquor, a number of gaseous sidestreams containing minor amounts of malodorous emission products. In conventional operations, these gaseous sidestreams, including those formed in the recovery furnace, digester, knotter hood, dissolver, evaporator, washer hood (both washer seal tank vent stream and washer hood vent stream) as well as in other apparatus stages, are merely partially oxidized during release through the stack. Because of the significantly large volume of these gas streams, compared to the limited amount of malodorous materials present, no full scale attempt has been made to remove these substances.

SUMMARY AND OBJECTS

It has now been found that the aforementioned malodorous substances, contained in various gaseous sidestreams of wood pulp processing, can be used as a source of make-up air in the pyrolysis-combustion process of U.S. Pat. Application No. 759,288, supra now U.S. Pat. No. 3,639,111, dated Feb. 1, 1972. In this manner the malodorous-material containing streams are subjected to the temperature of pyrolysis to destroy any organic sulfur-containing compounds therein while at the same time providing the make-up oxygen needed to accomplish partial oxidation and attendent heat input.

In another aspect of the invention, it is contemplated that various of the emission streams can be utilized as make-up air to provide partial oxidation in the pyrolysis of other organic materials such as in solid waste disposal operations as well as pyrolyzing the malodorous portion of the gas streams, thereby eliminating two problems at once.

In another aspect, it is contemplated that selected organic compounds can be recovered during pyrolysis. Thus, various compounds produced in the range of 500° to 750° C, such as aromatic phenols and various other hydrocarbons having individual commercial value, can be separated from the process stream at appropriate locations. For example, removal can be accomplished between the first and second reactors, or after the second reactor, by distillation, extraction, absorption, or any other conventional isolation process.

Other objects of the invention will become apparent from the following more detailed description and accompanying drawing in which, the single FIGURE is a schematic view of an apparatus system particularly adapted for the pyrolysis of kraft black liquor.

In the pyrolysis of kraft black liquor resulting from the kraft (sulfate) process in the pulping of wood, containing sodium salts, appreciable amounts of organic sulfur compounds, sodium sulfide, sodium thiosulfate, and traces of sodium sulfate, lime, iron oxide, alumina and potash, substantially all the atomic sulfur is converted to sulfide. The sulfide is distributed between sodium sulfide ($Na_2S$) in the ash and hydrogen sulfide ($H_2S$) in the gaseous end product. The hydrogen sulfide is readily removed from the gaseous fuel at the elevated temperature of the fuel by scrubbing with an alkali such as calcium carbonate, calcium oxide, sodium hydroxide or sodium carbonate.

It is important that the organic material be completely pyrolyzed and destructively distilled at a sufficiently high temperature and for a sufficient length of time to prevent the aforementioned recombination reactions, and thus produce the aforementioned stable end products. When produced, these end products will not recombine, and the resultant fuel will burn clean in the presence of oxygen and can be employed for energy purposes.

The destructive distillation and pyrolysis may be carried out in a single enclosed zone. The temperature at which recombination reactions are substantially precluded and a stable gaseous end product is formed has been found to commence in the temperature range of about 750° to 800° C. To insure that no recombination reactions will occur, the pyrolysis is conducted above the upper limit of this 750° to 800° C. temperature zone. A suitable temperature range is about 800° to 1,200° C. or higher and the time about 1 to 30 seconds. Temperatures above 1,200° C. may be employed but because of the detrimental affect on the equipment in which the pyrolysis is conducted such higher temperatures become increasingly impractical on a commercial basis.

As for time of pyrolysis, it is a function of temperature, decreasing as temperature is increased. The minimum time at any temperature is that required to produce the simple end product fuel from a particular organic feed material while the maximum time is immaterial as once such fuel is formed it remains stable. However, unnecessary time increases costs and thereby adversely affects economics of the process.

Advantageously, for purposes of most effective heating, it is desirable to initiate a reductive pyrolysis of the material in a first zone in which indirect heat is employed and from which the material is fed to a second pyrolysis and destructive distillation zone in which the simple stable clean gaseous end product is formed by the cracking. Whether one or two zones are used, after the gaseous components have been broken down or cracked to the stable end components, they will not recombine. Pyrolysis commences at a temperature of above about 200° C. A desirable temperature in this first zone is in the range of about 400° C. to 750° C. At the elevated temperature of the first zone, liquids, such as water, are vaporized thus leaving solid residue which together with gases are transferred to the second zone in which the pyrolysis is completed. Time in the first zone is not critical and can be selected to achieve maximum overall process efficiency; 1 to 20 seconds will normally suffice but may be extended if such extension does not adversely affect economics of the process.

In the first zone, external heat is applied to an enclosed vessel in which the initiation of the pyrolysis is conducted so that indirect heating of the feed material is employed. The vessel is made of material, desirably stainless steel, which is resistant to corrosion and erosion at temperatures below about 750° C. Thus, the material of the vessel determines the maximum temperature of the first pyrolysis zone. For insuring a satisfactory rate of initial pyrolysis, the temperature should be above about 400° C; and to prevent corrosion of the vessel, the temperature should be less than about 750° C.

In the pyrolysis zone wherein the temperature is sufficiently high (the second zone when two zones are employed) to form the simple stable clean burning fuel, external heat may be applied to maintain the temperature but is impractical with current commercial construction materials because of low heat transfer coefficients of these materials. In order to achieve the requisite cracking temperature in such zone, it is desirable and advantageous to introduce a controlled amount of a malodorous emission stream to initiate exothermic oxidative reactions and to supply and maintain that amount of heat necessary to bring the temperature in such pyrolysis zone in the desired range of 800° to 1,200° C. The volume of such malodorous streams is primarily air, and therefore they provide a ready source of oxygen in addition to having trace amounts of organic and inorganic sulfur-containing compounds.

The amount of emission stream that is introduced should be at a minimum, just sufficient to maintain the cracking temperature desired, which will vary with the type of material being pyrolyzed and equipment configuration and design. If too much is added, the included oxygen, over this minimum, results in pyrolysis gas from the cracking zone that will be diminished in fuel value. This is to be avoided as it would result in loss of energy production when the pyrolysis gases are subsequently burned as fuel.

Generally, the amount of oxygen introduced via the emission stream should be up to about 15 percent of that amount of oxygen required for complete stoichiometric combustion to achieve the pyrolysis temperature in the range of 800° to 1,200° C. The oxygen-containing emission stream is introduced at a point source in the pyrolysis zone such that it reacts continuously with combustible gases and carbon, and thereby is continuously and entirely consumed in a limited combustion section of the pyrolysis zone thus obviating build up in the concentration of free oxygen in the pyrolyzing gases. This stream can be introduced into the second stage, as illustrated supra, or between the first and second stages. Also, since the oxygen is entirely consumed in this limited section, as the gases and material move from such section, the transitory oxidative conditions thereat reconvert to reductive conditions under which cracking and pyrolysis are sustained.

Reference is now made to the attached schematic drawing depicting the pyrolysis of kraft black liquor. A first pyrolysis unit 2 is provided comprising an upright stainless steel cylindrical vessel 3 which is the first pyrolysis zone and is about 6 feet in height and 8 inches in diameter; the vessel being provided with a safety valve 4 and being enclosed in a refractory furnace chamber 5 providing annular heating space 6 about the vessel. Kraft black liquor is continuously sprayed into the vessel through the top thereof by spray nozzle 7 through which it is fed by pump 8; the liquor being preheated to any suitable temperature in preheater 9. Burners 11 are provided at the bottom of chamber 5 to apply the requisite heat to vessel 3. In vessel 3 not only is initial pyrolysis effected but the liquid is flash dried to dry solids.

From vessel 3 the partially pyrolyzed material flows by gravity through conduits 12 into the second pyrolysis and destructive distillation zone 13 wherein the final stable clean burning gaseous end product is produced. Because of the high temperature to which the material is subjected in this zone, the inside wall surfaces are lined with basic ceramic refractory lining 14. Zone 13 has an upright portion 16 rectangular in cross-section and below vessel 3, and a horizontal portion 17 also rectangular in cross-section communicating with the bottom of upright portion 16, both of which are about 6 feet long.

Vertical portion 16 is about 1 foot wide and three-fourths of a foot deep; and the horizontal portion is about 1 foot in height at its inlet end and about 1½ ft. in height at the opposite discharge end; the depth being the same as that of the vertical portion. The floor of the horizontal portion slopes downwardly to a sump at the melt discharge spout 18 which conducts the resultant smelt, indicated at 19, into a smelt receiver tank 20 having gas vent 21 leading to any suitable water seal trap (not shown), and serving the same function as the smelt tank employed in the conventional kraft black liquor recovery process. As usual in such process, tank 20 contains a weak alkaline aqueous liquor continuously fed into the tank through inlet 20' and in which the smelt is dissolved to form so-called green liquor which flows from the tank through outlet 21' to be treated further in the recovery process.

At its upper end, the vertical portion 16 is provided with a burner 22 for burning supplemental fuel to bring the second pyrolysis zone up to temperature in the start up operation. When the operating temperature is reached, firing with supplemental fuel is discontinued and operating temperature is sustained by introduction of malodorous-containing emission gases through inlet 23 at the upper end of vertical portion 16, which renders the pyrolysis self-sustaining as was previously described.

Stable clean burning fuel flows out of outlet 24 at the discharge end of horizontal portion 17 into absorber 25 into which any suitable alkali 25' which will absorb hydrogen sulfide, such as calcium carbonate, is continuously charged through rotary sealing valve 26 and continuously removed by sealed screw conveyors 27. The resultant clean burning combustible fuel flows out of outlet 28 of the absorber, and is conducted by tubing 29 to burner 31 of a boiler for generating steam; the burner gases being discharged from the boiler stack 32. Flue gases produced by burners 11 in the first zone 2 are also conducted to the boiler by tubing 33.

Because of the complete pyrolysis in the second pyrolysis zone 13, there is considerable excess energy available; and the stable fuel formed therein is conducted from tubing 29 through tubing 34 to burners 11 of the first zone 2 to effect continuous initiation of pyrolysis of the feed material in vessel 3. Malodorous-containing emission gas stream introduced into second reaction zone 13 is desirably preheated to minimize the amount required for achieving the desired temperature. For this purpose, pyrolysis gas is conducted by tubing 35 which is connected to tubing 34 and to a burner 36 supplying heat to preheater 37 containing coil 38 connected to gas inlet pipe 39 into which the requisite gas stream is admitted by a control valve 40 connected to a suitable blower (not shown). Coil 38 is also connected by tubing 41 to gas inlet 23. The combustion gases from preheater 37 are conducted by tubing 42 to the boiler where its residual heat is utilized.

When once started, the process is self-sustaining. However, to bring the system up to temperature to start the same, supplemental fuel must be employed to supply the necessary heat, and desirably natural gas is used, or, in its absence, other fuel. This gas is conducted from a suitable source thereof by tubing 43 to second pyrolysis zone burner 22; and a valve controlled bypass line 43' is connected to tubing 43 to conduct some of the gas through line 34 to burners 11 of the first pyrolysis unit, and through line 35 to burner 36 of preheater 37.

A main valve 44 in line 43 controls the supply of supplemental fuel. As indicated in the drawing, additional valves 46, 47, 48, 49, 51 and 52 are provided at suitable locations to appropriately control gas flow during the start up and pyrolysis operations. After the requisite temperatures have been established, the flow of supplemental fuel is discontinued, and the system is operated continuously. In this connection, during start up valve 47 is closed to preclude back flow of supplemental fuel through line 29 into absorber outlet 28 but is maintained open after start up when the supplemental fuel is shut off by valve 44.

Typical conditions for effecting complete destructive distillation and pyrolysis of kraft black liquor to the simple clean burning fuel end product are as follows:

Kraft black liquor, composed essentially of degradation products of lignin and carbohydrates solubilized by sodium hydroxide and sodium sulfide in the wood pulp operation, and containing about 50 percent solids after concentration, is continuously fed by pump 8 through preheater 9 maintained at a desirable temperature of about 200° C. The rate of continuous feed through spray nozzle 7 is about 2 lbs. of the concentrated liquor per minute. The residence time of the continually flowing material in vessel 3 is about 10 seconds; the mean temperature of the wall of the vessel being maintained at about 600° C. At this temperature and time the destructive distillation and pyrolysis has commenced; and by the time the material flows by gravity from the vessel 3 it is flash dried to complete solids whereby water vapor is present.

The temperature in the second reaction zone is maintained at about 900° to 1,200° C. with the maximum temperature being attained downstream of gas inlet 23, the total time of passage through the second zone being about 10 seconds which is sufficient to obtain complete cracking without formation of intermediate recombination reaction products. To achieve the temperature for maintaining this pyrolysis and destructive distillation self-sustaining, about 0.6 lbs. of emission gas per pound of black liquor (containing about 50 percent solids) is fed into gas inlet 23 of the second reaction zone. The gas is heated in the preheater to about 1,000° C.

The above temperature and times for the cracking of kraft black liquor are merely by way of example. All that is necessary for treatment of such liquor as well as for other organic material, is to heat at a sufficiently high temperature and for sufficient residence time in an enclosed zone so as to prevent recombination reactions and thus form as the gaseous end product a simple clean burning fuel comprising a gaseous mixture of hydrogen, carbon monoxide, carbon dioxide and methane. In the case of black liquor at such cracking temperature substantially all of the sulfur in the pyrolysis gas is present as hydrogen sulfide which is scrubbed out. This simple gaseous mixture when burned results in an exceedingly hot clean flame because of the nature of the fuel. Inasmuch as substantially all the sulfur is reduced to sulfide which is removed as previously described, the combustion products of the pyrolysis gas are odor-free.

In the example, although the solids concentration of the kraft black liquor is about 50 percent this is not critical as dry solid organic material as well as liquids, and liquid material containing solids can be pyrolyzed by the method hereof. However, where the moisture content is relatively high, it is preferable to reduce the moisture content by evaporation to an optimum value in order that heat requirements to achieve the desired elevated cracking temperature is thus minimized. Generally, concentration to about 40 to 60 percent solids is satisfactory but if the material originally contains less than 40 percent solids it need not be concentrated.

In an alternative embodiment to that illustrated in the single FIGURE, the hot pyrolysis gases are subjected to two stages of heat exchange prior to removal of the hydrogen sulfide. The first stage temperature was reduced for most efficient operation of the two heat exchangers; for example, 300° F was used. In the second stage, the latent heat of the water vapor was recovered and the condensate and pyrolysis gas was reduced to appropriate temperatures.

Following recovery of sensible and latent heat from the pyrolysis gas it was processed to recover sulfur. Although any of the commercial methods for the recovery of hydrogen sulfide from a gas stream are suitable, the most promising process for use in this operation was found to be the Ferrox process, a wet process utilizing an iron oxide suspension. Some advantages of this process over others include less space and labor, recovery of sulfur in the elemental form, relatively inexpensive process chemicals, less complicated equipment, past operating success in the presence of high carbon dioxide concentrations, and the reduction provided in the gas stream particulate matter. When this process is operated to maximize sulfur production, this system could also be adapted for use with the polysulfide pulping process or with one of the several sulfite pulping processes.

The pyrolysis gas can be stored subsequent to sulfur recovery and used on demand as the fuel to provide the heat requirements of the pyrolysis-combustion process. Excess pyrolysis gas would be used as fuel in a high pressure gas-fired boiler. In either instance the gas would have been scrubbed in the sulfur recovery and gas storage stages and should be essentially free of particulate matter. Thus, it should be possible to eliminate the electrostatic precipitator.

I claim:

1. In the method of processing an organic-containing material which comprises effecting destructive distillation and pyrolysis thereof in an enclosed zone at an elevated cracking temperature and for sufficient time to form an essentially inorganic smelt and a stable clean burning fuel as the gaseous end product containing hydrogen sulfide, including the steps of providing oxygen by introducing oxygen into said zone in an amount insufficient to accomplish complete oxidation, and preventing recombination reactions of intermediate products to minimize formation of atmospheric pollutants by maintaining said temperature during said destructive distillation and pyrolysis, the improvement comprising introducing into said Zone gaseous, by-product malodorous sulfur containing emission side streams as a source for providing said oxygen and to pyrolyze and destroy the malodorous portion of such streams.

2. A method in accordance with claim 1 wherein said organic-containing material is organic waste and said malodorous emission streams are gases produced in a kraft mill pulping process.

3. A method in accordance with claim 1 wherein said organic-containing material is kraft black liquor and said malodorous emission streams are gases produced in a kraft mill pulping process.

4. The method of claim 2 wherein said pyrolysis is initiated in a first enclosed pyrolysis zone to which external heat is applied and said stable fuel is formed in a second enclosed pyrolysis zone in communication with said first zone.

5. The method of claim 4 wherein said side stream providing oxygen is introduced into said second zone in an amount sufficient to maintain said cracking temperature and render said pyrolysis self-sustaining but less than that required for complete stoichiometric combustion of said material, and a portion of said gaseous end product is burned to provide such external heat applied to said first zone.

6. A method in accordance with claim 5 wherein the amount of said oxygen is up to about 15 percent of that amount required for complete stoichiometric combustion.

7. In the processing of kraft black liquor produced in a kraft wood pulping process wherein malodorous emissions of sulfur-containing gaseous side streams are formed as by-products, and wherein destructive distillation and pyrolysis of said black liquor is effected in an enclosed zone at an elevated cracking temperature for a time sufficient to form as the gaseous end product a stable clean burning fuel containing hydrogen sulfide, oxygen is introduced into said zone in an amount insufficient to accomplish complete oxidation, and wherein recombination reactions of intermediate products are prevented by maintaining said cracking temperature during said destructive distillation and pyrolysis to minimize formation of atmospheric pollutants; the improvement of destroying the malodorous portion of such a by-product sulfur-containing side stream and simultaneously utilizing such side stream as a source for providing said oxygen which comprises the step of introducing such by-product side stream into said zone to pyrolyze said malodorous portion as well as said black liquor.

* * * * *

UNITED STATES PATENT OFFICE
CERTIFICATE OF CORRECTION

Patent No. 3,718,446            Dated February 27, 1973

Inventor(s) David L. Brink et al.

It is certified that error appears in the above-identified patent and that said Letters Patent are hereby corrected as shown below:

Column 5, line 5, "melt" should read -- smelt --. Column 6, line 22, "200° C." should read -- 220° C. --. Column 8, line 17, "claim 2" should read -- claim 3 --.

Signed and sealed this 19th day of February 1974.

(SEAL)
Attest:

EDWARD M. FLETCHER, JR.            C. MARSHALL DANN
Attesting Officer                  Commissioner of Patents